E. A. COTELLE.
Alcohol Still.
No. 41,685.
Patented Feb. 23, 1864.
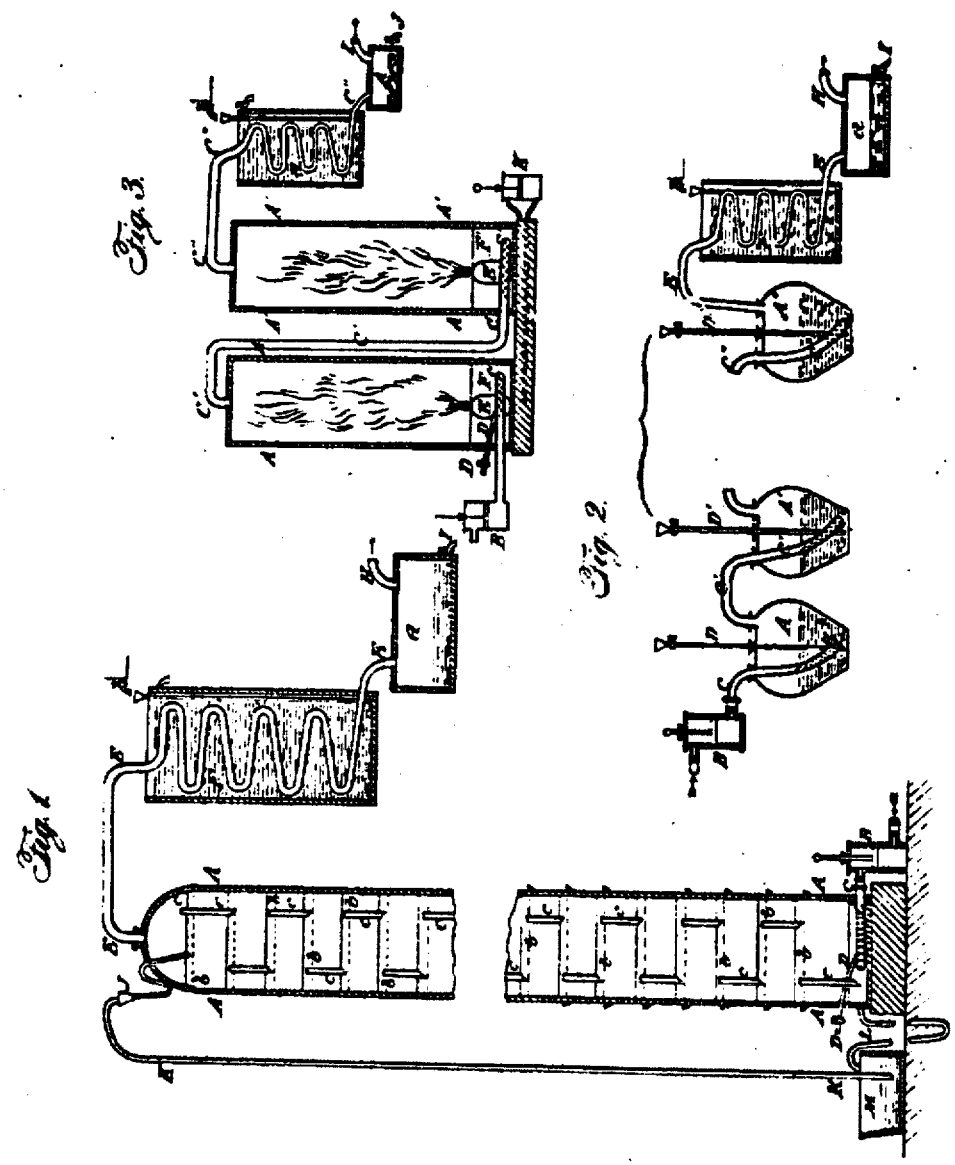
Witnesses:
Alex T. Roberts
J W Coombs
Inventor:
E A Cotelle

UNITED STATES PATENT OFFICE.

EUGÈNE ALPHONSE COTELLE, OF PARIS, FRANCE.

IMPROVED MODE OF MANUFACTURING ALCOHOL FROM OLEFIANT GAS.

Specification forming part of Letters Patent No. 41,685, dated February 23, 1864.

*To all whom it may concern:*

Be it known that I, EUGÈNE ALPHONSE COTELLE, of Paris, in the Empire of France, distiller, have invented an Improvement in Manufacturing Gas Alcohol; and I do hereby declare that the following is a full, clear, and exact description of the same, reference being had to the annexed sheet of drawings, making a part of the same.

The object of my invention is to manufacture alcohol with any gas containing olefiant gases, and by using as combining agent certain bodies acting indefinitely without revivification.

The following are the principles upon which this invention rests: First, an equivalent of alcohol, $(C_4H_6O_2,)$ is composed of an equivalent of olefiant gas $(C_4H_4)$ plus two equivalents of water, $(2HO;)$ secondly, if I treat by a diluted acid some fecula, for instance, which only differs from glucose by four equivalents less of water, this acid will cause some water to combine with the fecula, which will then be transformed into glucose further, the acid will not be impaired in the least, which is a character of the present action; thirdly, it appears to result from the above principle that should olefiant gas be treated by a diluted acid this must fix some water upon the olefiant gas and produce alcohol, or at least I have been taught to by experience; but success is subordinated to various momentous conditions that are to be fulfilled, and which I shall mention when describing the apparatus and manipulations which have best succeeded heretofore.

To enable those who are skillful in the art to understand my invention, I will proceed to describe summarily the various operations, without going at present into any details.

This fabrication presents three distinct stages, which are, first, the production of gas and its purification; secondly, the formation of alcohol; thirdly, the distillation and rectification. I shall only mention at present the formation of alcohol, the first and third phases having to undergo but some slight changes in the details. In an apparatus so disposed as to multiply the points of contact, I let in from downward a stream of gas and one of steam. From upward I drop hot acidulated water, which I constantly collect at the bottom to bring it again to the top. In this contact between gas, steam, and acidulated water the acid will fix on the olefiant gas two equivalents of water, which transform it into alcohol. This alcohol, which is in the state of vapor, escapes with the non-combined gases, passes into a refrigerator, where it is liquefied, and then into a closed vessel provided with a tube for the escape of the gases. This alcohol, being submitted to distillation for raising its degree, passes afterward to the rectifying process. The same acidulated water, as may be observed, is constantly employed, being kept constantly hot by the jet of steam. This being once well understood, I may now describe particularly the three stages of the operation.

I. *Production and purification of gas.*—I have to say but little on this subject. It is important that the matters to be distilled—such as coal, bog-head, oil, &c.—be distilled at a temperature which permits to obtain the greatest amount of olefiant gas without minding the whole quantity of gas. As regards the purification thereof, it must be as good as possible, and in order to get clear of all other carburets which are not either olefying gas or protocarbureted hydrogen—such as propylen, amylen, &c.—it should be proper to have the gas bubble into a diluted film of sulphuric acid or a film of olive-oil.

II. *Formation of alcohol.*—As I hinted above, I do not limit myself to the form or shape of the apparatus, which may be varied indefinitely. Provided that the gas be long enough in contact with acidulated water raised to a suitable degree of temperature, the formation of alcohol will take place, and therefore I might restrain myself from stating the requisite condition. I will, however, describe three very plain apparatus which proved to yield good results. Forbearing to give any preference to either of these apparatus, as they all have their advantages according to circumstances, I will describe them in the same order I have experimented with them.

*First apparatus.*—The first apparatus consists of a column, A A A A, Fig. 1, of lead, wood, or earthenware, divided into compartments by lead sheets *b b b b*, &c., perforated and intended to let out the steam and gases. These sheets or plates have spouts *c c c c*, through which the liquid drops. At the lower part of the column there is a tube *c c*, through which the gas is injected by a pump, B. D D is a tube to inject steam. L is a siphon for letting out freely into the recipient M the liquid dropping down from the column. K K is a tube for raising by means of a pump the liquid from recipient M into the funnel-siphon J, which drops it again into the column. E E is a tube which leads the vapors and gases into the refrigeratory-worm F and thence into a closed vessel, G, in which the liquid remains while the gases escape through the tube H. An exhausting-cock, I, is fitted at the bottom of said tube H. To work this apparatus, steam is let in through tube D and acidulated water containing about fifteen per cent. of acid into the funnel J. (I prefer using sulphuric acid on account of its cheapness and great fixing action.) When the liquid has risen to the boiling-point, some gas is injected by means of pump B, when the gas and steam are brought in contact in presence of the hot diluted acid and the olefiant gas combines with a certain quantity of water in order to form alcohol, which escapes, vapor-like, through tube E E, is liquefied into the refrigerator F, and finally goes into the vessel G, while the non-combined gases escape through the tube H, which leads them into a receiver to be used afterward for heating purposes. The diaphragms $b\ b\ b\ b$, upon which lies constantly a liquid stream which the gases must go through previous to their ascension, are meant for no other purpose but multiplying the points of contact. It will be observed that the hot acidulated water drops down incessantly into the column and is incessantly raised up and poured thereinto again. The injection of steam must be so regulated that the density of the liquid should not be much changed. The liquid in the vessel G, which contains about fifteen per cent. of alcohol, is submitted to a first distillation, as will be seen hereinafter. The injection of gas is to be calculated so as that the gas may take about fifteen minutes to pass through the column.

*Second apparatus.*—This second apparatus consists of about thirty jars provided with three pipes, A A' A", Fig. 2, the two-thirds of which are heated in a sand bath, the other third being unheated. The jars carry each a tube, C C C' C' C" C", perforated with holes at their lower part for the bubbling of the gas, and a tube with a funnel provided with a cock, D D' D", for the introduction of the liquid. A forcing-pump, B, drives the gas into the first jar. A tube, E, leads the steam and gases into the refrigerator F, as for the apparatus above described. To work this apparatus, all the jars are first half filled with acidulated water containing about ten per cent. of acid and then heated. When the jars which are out of the sand bath begin to be heated, some gas is injected by means of pump B. This gas, after bubbling into the first jar, A, escapes, together with the vapor formed by tube C' C', to go and bubble into the second jar, A', and so on till it reaches the jar A". In this progress the olefiant gas gets combined with water, in order to form alcohol, which escapes with the gases through the tube E E to go and enter the recipient G, as above. In order to renew in the jars the water, which alone is evaporated, the pump is for a moment stopped and some hot water is introduced through the tubes D D' D". The level of the liquid is ascertained by taking away the cock-key and introducing into the tube a small cork float hanging from a string.

*Third apparatus.*—This third apparatus, which I prefer on account of its simplicity and efficiency, consists of two large wooden boxes, A A A A, A' A' A' A', Fig. 3, provided each with a cock-funnel for the introduction of the liquid, with an exhaust-siphon for the purpose of maintaining the level of the liquid, with a tube indicating this level, and with a discharge-cock. (These four pieces are not shown in order to avoid confusion.) The first box carries a steam-tube, D D, and a worm, C C, through which a forcing-pump, B, conveys gas, which bubbles into the liquid. The steam and gases in the first box A are conveyed next through the tube C' C' C' to go and bubble likewise into the liquid in A', escape through the tube C" C", get cool in the refrigerator G, and thence onto the recipient H, as above. In the middle and at the lower part of each box there is a lead cylindrical vessel, E E', having an india-rubber valve, F F', opening from inward. The upper part of these vessels is somewhat narrowed and terminates with a watering-pot rose or head. At the bottom the vessels are set in communication, the one with the lower part and the other with the upper part of a force-pump, K, proof against diluted acids. To work this apparatus, some acidulated water is introduced into the vessels, which water contains twelve per cent., about, of acid, so as to cover the vessels E E', and then a film of steam is injected through the tube D D. When the liquid is hot, some gas is injected by means of pump B, and, besides, the pump K is made to force alternately in the two boxes a film of liquid, which drops in a shower. The alcohol thus formed escapes with the gases through the tube C" C", as above. The injection of gas should be so regulated as the film should not issue from the second box before twenty minutes at least are elapsed.

*N. B.*—In the apparatus first described I may lay on the plates some dividing bodies, so as to increase the points of contact, and also the jars in the second apparatus may be filled likewise with dividing bodies. Care must be taken, however, not to employ coke, which would produce sulphurous acid. In the first apparatus all the plates may also be suppressed and the column filled from upward.

III. *Distilling and rectifying.*—The liquid obtained in the above apparatus, being at a low degree, wants to be distilled previous to its being rectified. It would be proper that the apparatus should be provided with a small refrigeratory apparatus for the collection of ether, which is ever formed in small quantities. Most part of the essential oils should also be eliminated, so as to obtain readily an efficient rectification.

I do not confine myself to the form or construction of the apparatus, which may be varied without departing from the principle of my invention; but

What I claim as my invention, and desire to secure by Letters Patent, is—

Forming alcohol from olefiant gas and water by means of diluted acids acting only by their presence without reconcentration or revivification, substantially as herein described.

A. COTELLE.

Witnesses:
 HARIALLY,
 E. HERMAN GOODE.